(12) United States Patent
Gray et al.

(10) Patent No.: US 10,956,784 B2
(45) Date of Patent: Mar. 23, 2021

(54) NEURAL NETWORK-BASED IMAGE MANIPULATION

(71) Applicant: A9.com, Inc., Palo Alto, CA (US)

(72) Inventors: Douglas Ryan Gray, Redwood City, CA (US); Alexander Li Honda, Sunnyvale, CA (US); Edward Hsiao, Sunnyvale, CA (US)

(73) Assignee: A9.COM, INC., Palo Alto, CA (US)

( * ) Notice: Subject to any disclaimer, the term of this patent is extended or adjusted under 35 U.S.C. 154(b) by 263 days.

(21) Appl. No.: 16/222,318

(22) Filed: Dec. 17, 2018

(65) Prior Publication Data

US 2019/0138851 A1 May 9, 2019

Related U.S. Application Data

(63) Continuation of application No. 15/174,628, filed on Jun. 6, 2016, now Pat. No. 10,157,332.

(51) Int. Cl.
  *G06K 9/62* (2006.01)
  *G06T 11/00* (2006.01)
  *G06K 9/00* (2006.01)
  *G06T 11/60* (2006.01)

(52) U.S. Cl.
  CPC ....... *G06K 9/6257* (2013.01); *G06K 9/00671* (2013.01); *G06K 9/623* (2013.01); *G06T 11/00* (2013.01); *G06T 11/60* (2013.01)

(58) Field of Classification Search
  CPC .. G06K 9/6257; G06K 9/00671; G06K 9/623; G06T 11/60; G06T 11/00
  See application file for complete search history.

(56) References Cited

U.S. PATENT DOCUMENTS

| | | |
|---|---|---|
| 7,945,099 B2 | 5/2011 | Gokturk |
| 9,792,534 B2 | 10/2017 | Wang |
| 9,875,258 B1 | 1/2018 | Hsiao |
| 2006/0274060 A1 | 12/2006 | Ni |
| 2008/0082426 A1 | 4/2008 | Gokturk |
| 2008/0212899 A1* | 9/2008 | Gokturk ............. G06Q 30/0603 382/305 |

(Continued)

OTHER PUBLICATIONS

U.S. Non-Final Office Action issued in U.S. Appl. No. 15/174,628 dated Mar. 26, 2018.

(Continued)

*Primary Examiner* — Wesley J Tucker
(74) *Attorney, Agent, or Firm* — Hogan Lovells US LLP

(57) ABSTRACT

An image creation and editing tool can use the data produced from training a neural network to add stylized representations of an object to an image. An object classification will correspond to an object representation, and pixel values for the object representation can be added to, or blended with, the pixel values of an image in order to add a visualization of a type of object to the image. Such an approach can be used to add stylized representations of objects to existing images or create new images based on those representations. The visualizations can be used to create patterns and textures as well, as may be used to paint or fill various regions of an image. Such patterns can enable regions to be filled where image data has been deleted, such as to remove an undesired object, in a way that appears natural for the contents of the image.

20 Claims, 11 Drawing Sheets

(56) References Cited

U.S. PATENT DOCUMENTS

| | | |
|---|---|---|
| 2009/0327094 A1 | 12/2009 | Ellen |
| 2011/0010319 A1 | 1/2011 | Harada |
| 2016/0350336 A1* | 12/2016 | Checka ............... G06K 9/4628 |
| 2017/0169495 A1 | 6/2017 | Rathus |
| 2017/0249769 A1* | 8/2017 | Fried .................... G06K 9/4671 |
| 2018/0018553 A1 | 1/2018 | Bach et al. |
| 2018/0137143 A1* | 5/2018 | Brundage .............. G06K 9/626 |
| 2020/0193206 A1* | 6/2020 | Turkelson .......... G06K 9/00671 |

OTHER PUBLICATIONS

U.S. Notice of Allowance issued in U.S. Appl. No. 15/174,628 dated Aug. 13, 2018.

\* cited by examiner

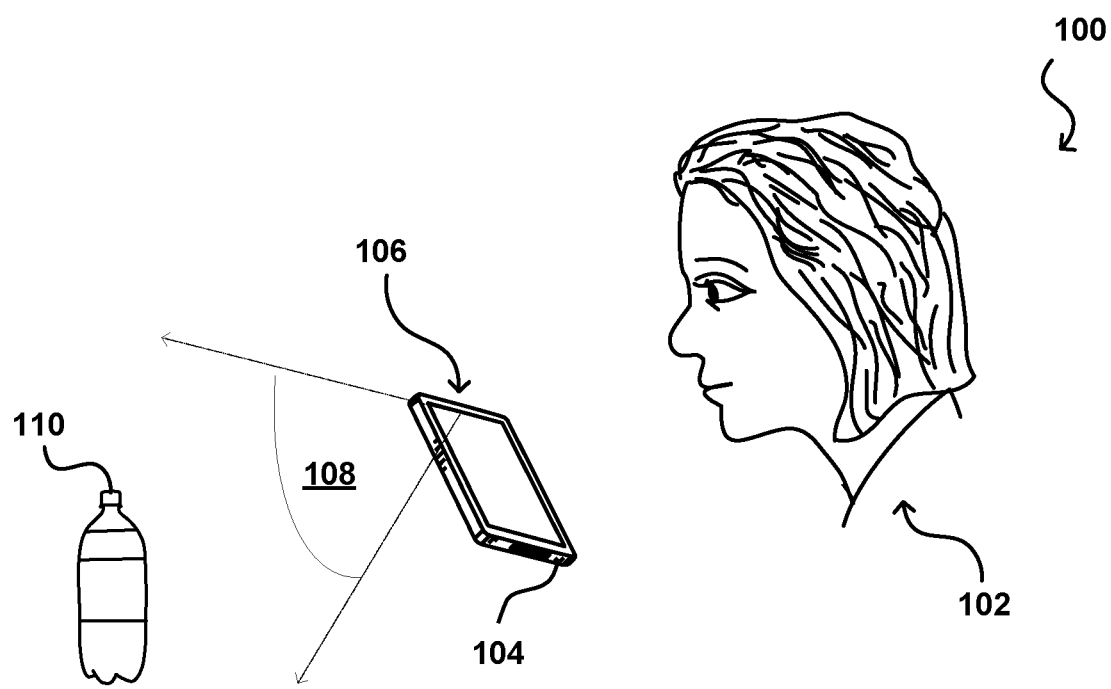
FIG. 1A
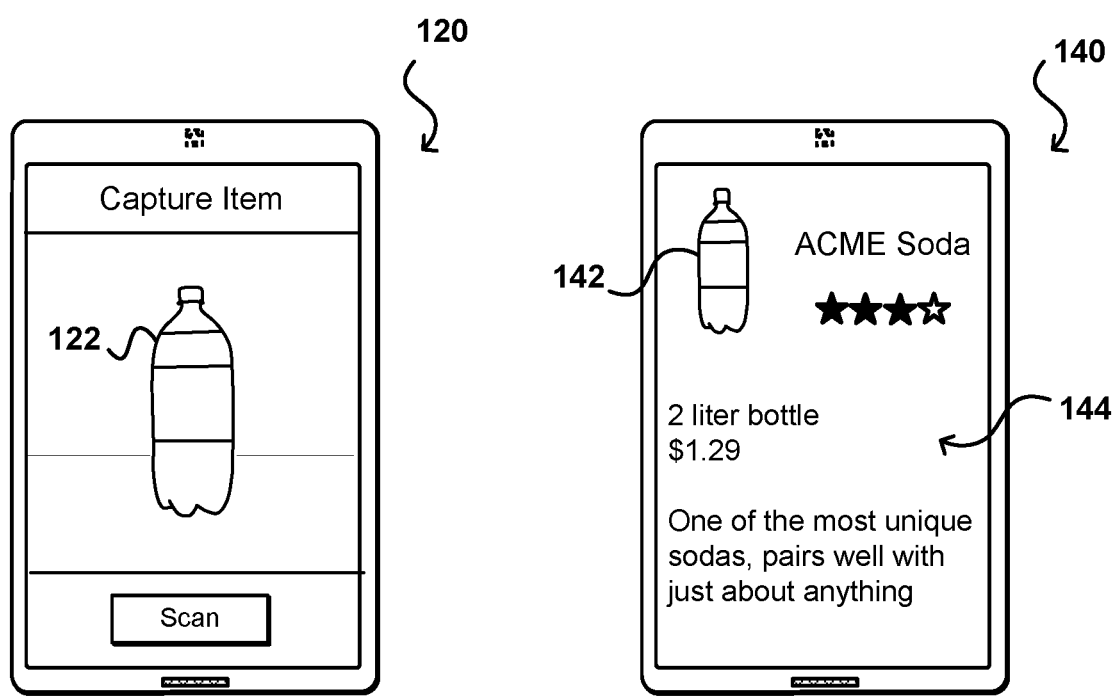
FIG. 1B
FIG. 1C

NEURAL NETWORK-BASED IMAGE MANIPULATION

CROSS REFERENCE TO RELATED APPLICATIONS

This application is a continuation of allowed U.S. application Ser. No. 15/174,628, entitled "NEURAL NETWORK-BASED IMAGE MANIPULATION," filed Jun. 6, 2016; of which the full disclosure of this application is incorporated herein by reference for all purposes.

BACKGROUND

Many artists take advantage of digital tools to create and edit images. These tools can include the ability to digitally draw or paint an image and the ability to copy and paste image content into an image, among others. Even with significant advances, these tools still rely upon the artist to manually create or modify much of the image content, which can be a complex and time-consuming endeavor.

BRIEF DESCRIPTION OF THE DRAWINGS

Various embodiments in accordance with the present disclosure will be described with reference to the drawings, in which:

FIGS. 1A, 1B, and 1C illustrate an example situation where barcode data represented in an image captured by a client device can be used to cause information about the corresponding product to be displayed on the client device in accordance with various embodiments.

DETAILED DESCRIPTION

Figure 2:
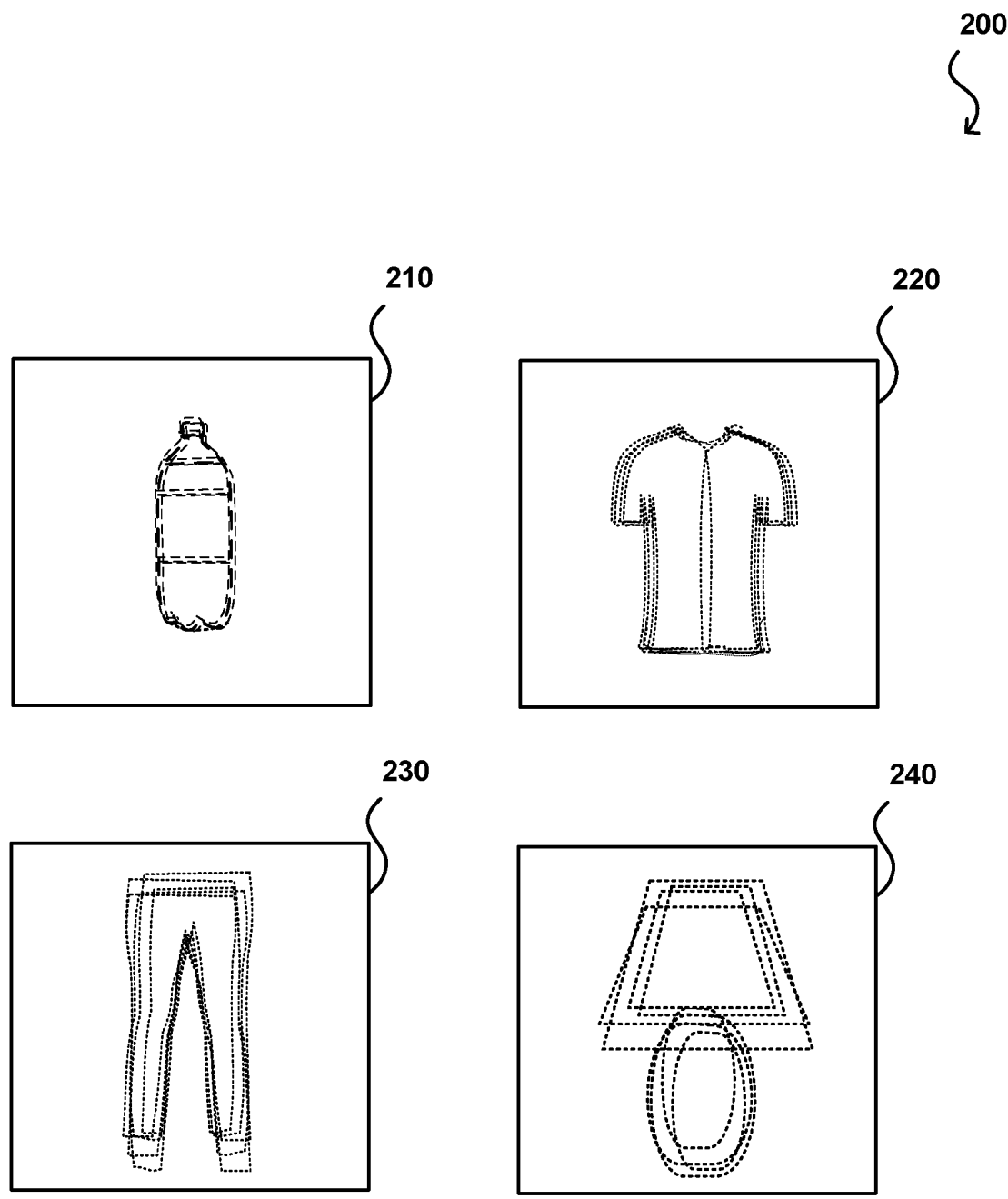
FIG. 2 illustrates example image data representative of various types of objects learned through a trained neural network that can be utilized in accordance with various embodiments.

Systems and methods in accordance with various embodiments of the present disclosure may overcome one or more of the aforementioned and other deficiencies experienced in conventional approaches to creating or editing digital content. In particular, various embodiments utilize data sets resulting from the training of neural networks to create instances or visualizations of one or more objects in an image. In at least some embodiments, an object classification will correspond to a data set or other object representation, and the gradient of an image patch for that classification can be added to, or blended with, the pixel values of an image in order to enable a visualization of a type of object to be added to the image. This can be performed in at least some embodiments by using a gradient descent algorithm to modify the image based on the object representation. A gradient descent algorithm is a first order optimization algorithm typically used to find a local minimum of a function. This can enable a user to add a type of object to an image, although in an abstract or stylized representation, with little effort on the part of the user. Such an approach can be used to add objects to existing images or create new images, among other such options. The visualizations can be used to create patterns and textures as well, as may be used to paint or fill various regions of an image. Such an approach can enable regions to be filled where the image data has been cut or deleted, such as to remove an undesired object, in a way that looks natural for the contents of the image.

Various other applications, processes and uses are presented below with respect to the various embodiments.

FIG. 1A illustrates an example environment 100 in which a client device 104 is being operated by a user 102. Although a portable computing device (e.g., a smart phone or tablet computer) is illustrated, it should be understood that a variety of other types of client devices can be utilized as well, as may include notebook computers, smart TVs, desktop computers, set top boxes, wearable computers (e.g., glasses, watches, or contacts), and other such devices. In this example, a camera 106 of the client device is being positioned such that an item or object of interest 110 is contained within a field of view 108 of the camera. In many instances a near live view of the captured image data can be displayed on a display screen of the computing device 104 such that the user 102 can ensure that the item of interest 112 is represented in the captured image data. In this example the user 102 is interested in obtaining information about the item of interest. Accordingly, the user can cause data representative of the item to be captured by the camera 106 of the computing device.

FIG. 1B illustrates an example presentation 120 of content wherein image data captured using the camera is displayed on a display screen of the computing device. As illustrated, the representation 122 of the object is contained within the captured image data based on the relative orientation of the camera to the item of interest. The user can adjust the orientation, zoom, focus, and/or other such aspects in order to attempt to capture a clear, focused image of the object that is in a typical orientation (upright in this example) and occupies a significant portion of the display screen, in order to enable a typical representation of the object to be captured that can be accurately analyzed. When the user is satisfied with the representation of the object in the image data as displayed, the user can select an option to cause the image to be captured or otherwise selected for analysis. In some embodiments an image analysis process on the computing device will attempt to determine when the object is in sufficient focus or otherwise represented with sufficient clarity or image quality, for example, and can automatically capture or select an image frame, among other such options.

Once an image or image frame is selected for analysis, that image frame can be analyzed on the device or uploaded to a remote analysis service, among other such options. As part of the analysis, the image data can be analyzed using one or more algorithms to attempt to locate the representation of the object in the image data. These algorithms can include, for example, pattern matching, feature detection, image recognition, object detection, and other such algorithms as known or used in the art for locating specific types of objects or content represented in image data.

The portion of the image corresponding to the object can then be used to identify the corresponding object, or at least a type of object. In the example situation 140 of FIG. 1C, the object represented in the image data was determined to correspond to a bottle of soda. Once identified, information such as an image 142 of the bottle and associated information 144 can be located and provided for display on the computing device. Various other types of information or content can be located and presented as well within the scope of the various embodiments. In this example, the identifier can be used to search through an electronic catalog, or other data repository, that includes listings of objects and their associated identifiers. This repository can be maintained by a provider of the interface or application from which the content is displayed, or can be provided by a third party.

As known for object recognition, image data for a portion of an image can be compared against a library of image data in order to attempt to determine matching image data which corresponds to a type of object. In at least some example, many images of that type of object can be used to train a neural network to recognize objects of that type as represented in input image data. Neural networks are trained to predict class labels using gradient descent with a large amount of training data. Neural networks (NNs), such as convolutional neural networks, are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. NNs exploit spatially-local correlation by enforcing a local connectivity pattern between nodes of adjacent layers of the network. Different layers of the network can be composed for different purposes, such as convolution and sub-sampling. In one example there is an input layer which along with a set of adjacent layers forms the convolution portion of the example network. The bottom layer of the convolution layer, along with the lower layer and output layer, make up the fully connected portion of the network. From the input layer, a number of output values can be determined from the output layer, which can include several items determined to be related to an input item, among other such options. NN is trained on a similar data set (which includes dress, pants, watches etc.), so the network can learn the best feature representation for this type of image. Trained NN can be used as a feature extractor: an input image can be passed through the network and intermediate layer outputs can be used as feature descriptor of the input image. Similarity scores can be calculated based on the distance between the one or more feature descriptors and the one or more candidate content feature descriptors and used for building relation graph.

In order to determine the objects in a particular image, it can be desirable in at least some embodiments to identify the portions of the image that correspond to a single object. This can involve any of a number of segmentation processes, which can be performed manually or automatically in various embodiments. In a manual process, a person can cut, crop, or otherwise specify portions of an image that correspond to different items, such as apparel items, jewelry, and the like. The designated portions can be analyzed by an object recognition algorithm, for example, where a category or type of item might initially be specified in order to minimize the search space, while in other instances the object recognition algorithm can do a full search against an entire search space, such as an electronic catalog.

In other embodiments, an automatic segmentation process can be used to analyze the various images and attempt to segment the image into portions corresponding to individual objects or items in the image. A first step of such an approach can involve removing background portions of the image or otherwise removing from consideration any portions of the image that do not correspond to an item of interest, in order to improve the accuracy of the results and lessen the amount of data to be analyzed. A cropping process can begin by starting at the corners and/or edges of the image and moving each side of a rectangle inward until an edge or portion of a contour of an object is detected. It should be understood that a rectangle is used here for speed and simplicity because the image of interest is rectangular, but that other shapes can be used as well, such as squares, circles, and irregular shapes or contours. In some instances the background color will be known such that the process can move inward until a region with a color other than the background is determined. In other embodiments, the background color may need to be determined or background objects in the image removed using any appropriate process known or used for such purposes in other image-related processes. After each edge has stopped at an edge or contour of an object, a bound region of the image will be determined that will include the item of interest. The image in some embodiments can then be cropped to this region, such that the background pixels previously located outside this region in the image are removed from the image file.

In at least some embodiments, a different approach can be taken to attempt to determine the region corresponding to the object versus the background region. For example, an attempt can be made to locate and/or grow connected regions of background color (or ranges of background color) from the corners or sides of the image towards the center of the image, to the extent possible. A connected component analysis, for example, can be utilized to attempt to connect the entire background region of the image, with the remaining region(s) being considered potential objects(s) of interest. In an example situation, an outline or mask region can be determined that then corresponds to the foreground (or background) portion of the image. This can be used to crop or select the image region based on the location of the object, or can be used to expand the object to the appropriate aspect ratio, as discussed elsewhere herein.

If the image includes multiple objects, the connected components analysis can still connect the background regions, which can result in determining a second object region in the image. Various approaches can then either consider these objects together or as separate objects for purposes of cropping or image match. For images with multiple such object regions, one or more rules or policies could be utilized that indicate to select only the top region, most central region, largest region, etc.

Once an image region is selected, that region can be analyzed using any of a number of different image analysis algorithms to generate a set of descriptors for the object region in the image data. As mentioned, a collection of image data can be searched to identify content similar to the query image. Since descriptors have been calculated or obtained for the query image, comparing images can be accomplished by comparing the descriptors of query images to the descriptors of the images of the collection, which can have been determined using a trained neural network as discussed elsewhere herein. For example, distances may be determined between the local-texture, global-shape, and local-shape histogram descriptors of the query image and the local-texture, global-shape, and local-shape histogram descriptors of the images in the collection of images. According to some embodiments, dot product comparisons are performed between the histogram descriptors of the query image and the corresponding histogram descriptors of the images of the collection. The dot product comparisons are then normalized into similarity scores. Thus, between any two images, three similarity score are provided: (1) a similarity score between the local-texture histogram descriptors of the images; (2) a similarity score between the global-shape histogram descriptors of the images; and (3) a similarity score between the local-shape histogram descriptors of the images. After similarity scores are calculated between the different types of histogram descriptors of the images, the similarity scores can be combined. For example, the similarly scores may be combined by a linear combination or by a tree-based comparison that learns the combinations. For example, using a linear combination may provide the advantage of enabling a user to assign different weights to the different types of descriptors, thereby causing the search module to consider the weighting when selecting the nearest content histograms. It should be appreciated that instead of a dot product comparison, any distance metric could be used to determine distance between the different types of histogram descriptors, such as determining the Euclidian distance between the histogram descriptors.

After the combined similarity scores are determined, a set of nearest descriptors may be selected. For example, the search module may select a subset of content descriptors associated with images of the collection that are nearest the query descriptors as determined by the combined similarity scores. Images in the collection associated with the subset of nearest descriptors may be provided for analysis and/or presentation. For example, the search module may determine images in the collection that match the set of nearest content descriptors selected and provide at least reference to the matching images. As mentioned, in various embodiments the references can be used with a recommendations module to generate recommendations for a user based on information known or obtainable with respect to the items for the matching images.

In at least some embodiments, the neural network will be trained using sets of images for specific classifications of objects. For example, a neural network might be trained using a set of images (i.e., hundreds or thousands in some cases) of wristwatches, such that when a query image including a wristwatch is received the wristwatch can be quickly identified based on aspects (i.e., feature points or contours) in the image that correspond to similar aspects of the trained neural network for wristwatches. Through the training, each trained neural network will essentially generate a data set that is "representative" of the particular class of objects, in that it includes data that corresponds to analysis of many images of objects of that type and can be used to identify various objects of that type with similar aspects. FIG. 2 illustrates a set of visualizations 200 corresponding to a neural network trained for different types of objects that can be generated in accordance with various embodiments. In a first example, a data set 210 is generated from the training that is representative of a soda bottle, in particular a two-liter bottle. Because the neural network was trained using images of different types of soda bottle, even if the scale and orientation can be accounted for there will be some variation in the shapes and appearance of the bottles used for the training. Thus, the data set will represent more of a general shape or contour, or range of shapes or contours, of objects of that type. Thus, as illustrated the data set will not provide a photo-realistic representation of a soda bottle, but more of an overall "impression" of such an object, including the primary features, contours, and other aspects that can be used to readily identify such an object. Thus, although the data set 210 does not represent an accurate image of a soda bottle, based on the features of the data a viewer of a visualization of that data set would quickly be able to determine that the object is a soda bottle. The other data sets 220, 240, 260 illustrated show visualizations that are not photo-realistic, but can readily be identifiable as a t-shirt, pair of pants, and lamp, respectively. Due to differences in style and shape of the training images the range of data points and features can vary, and the focus of the training set can significantly impact the sharpness of the visualization. For example, training on a specific brand or model of lamp will result in a data set that very closely represents that particular lamp, while sets that include all table lamps or all lamps in general will include much larger amounts of variation, and thus will be more abstract to objects of a particular overall type or classification. The neural network can thus be trained at different levels or subcategories of a type of object, which can provide higher accuracy and detail but may be less likely to classify or recognize other objects of that type. The level of detail contained in an abstraction of the corresponding data will also vary accordingly.

Figure 3:
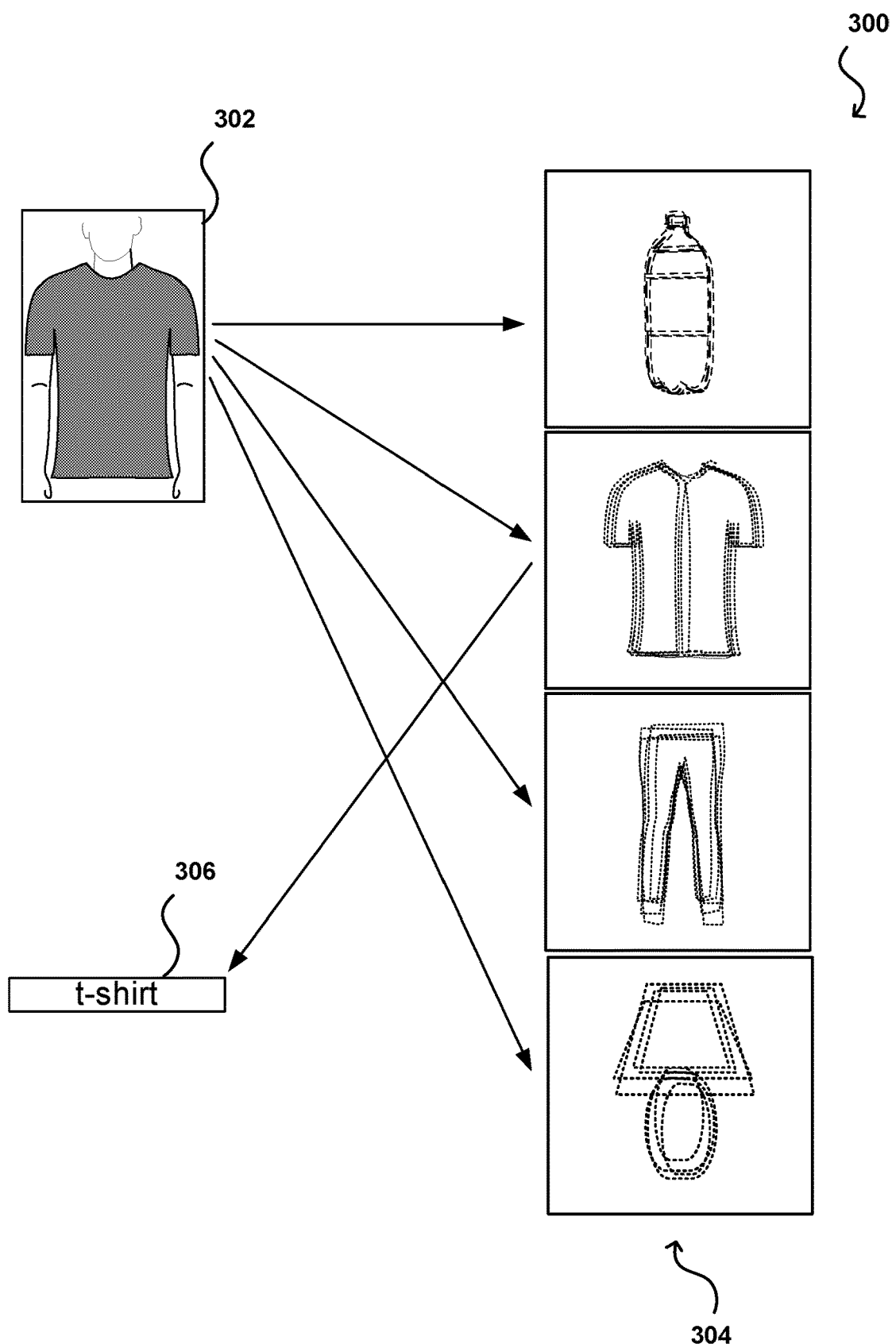
FIG. 3 illustrates an example process for determining an object classification using data from a trained neural network of a conventional image classification approach.

As mentioned, once a neural network has been trained for various types of objects, the corresponding data can be used to analyze and classify various query images. For example, FIG. 3 illustrates a situation 300 wherein a query image 302 including a shirt is received. The image can be pre-processed as mentioned, such as to attempt to locate a region of the image corresponding to the object of interest. The image data for the region of interest can then be compared against the data sets 304 resulting from the trained neural networks to attempt to find a match. In this example, a "match" can correspond to a data set from a trained neural network for a type of object that includes features, contours, or other aspects that correspond to those of the query image with sufficient similarity that a computed confidence level, or other such value or score, meets at least a minimum threshold to say with confidence that the query image includes a representation of an object of that type. In this example, the region of the query image is compared against the data sets 304 indicated, and the data set trained on a t-shirt can be found to match with sufficient confidence that the query image can be classified to include the category or classification 306 of a t-shirt. Thus, using the results of the neural network training an input image can be processed to produce a corresponding classification label. Various approaches for using trained neural networks to produce such classifications can be used within the scope of the various embodiments.

Figure 4:
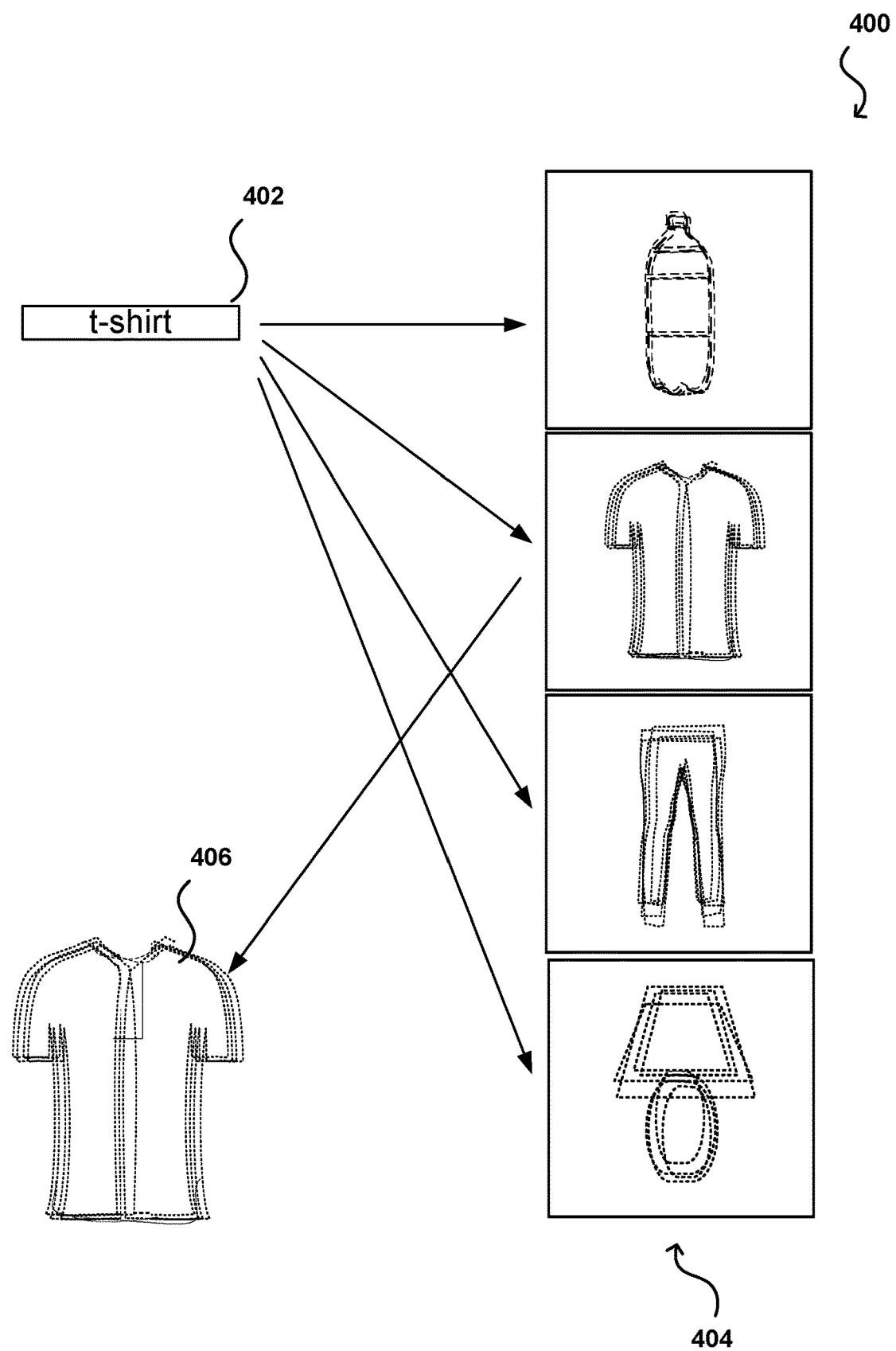
FIG. 4 illustrates an example process for using a classification label to enable image data to be added to, or used to create, an image that can be utilized in accordance with various embodiments.

Once the data sets are obtained from the trained neural network, another process can be performed that provides an inverse operation. In particular, given a classification, an image can be produced that is representative of that classification. FIG. 4 illustrates one such situation 400 wherein an input classification 402 is provided. This could be selected by a user or application, for example, that wants to generate or receive some type of image including a representation of an object of that type. In this example, the classification 402 can be used to search a group 404 of data sets resulting from trained neural networks to determine whether a data set exists that matches, or otherwise corresponds to, the input classification with sufficient confidence, etc. For example, the classification might correspond to "shirt" or "top" but some of the images used to train the model might have had "t-shirt" associated, whereby a match can be determined with at least some level of confidence. In response to locating a matching data set, the data can be used to generate a visualization 406 of an object representative of that classification. Thus, a user requesting a visualization of a t-shirt might receive data enabling a visualization to be created that appears as an abstraction of a t-shirt. This image data can then be used to create or edit an image using various approaches discussed and suggested herein.

In a first example 500, the visualization can be used to create a random, non-repeating pattern 506 based at least in part upon the visualization. In this example, the user can "paint" an area of an existing image by moving a selection area 504 across an image in an image editing program, for example, such as by dragging a finger across a touch screen or moving a mouse cursor 502 or other such element as known in the art for image manipulation and other such purposes. In this example, the pattern 506 comprises multiple instances of the selected object type, in this case a soda bottle. The image editing program can contain various tools and options for adjusting aspects of the pattern, such as the size or color of the individual bottles, the size of the selection area 504, the sharpness of the painting, and other such options. In at least some embodiments the pattern will be "blended" with the corresponding portions of the image, with the pixel values for the bottle portions being added to, or otherwise averaged or mixed with, the pixel values for the corresponding pixel locations. The amount by which the bottle pixel values modify the pixel values of the image can be adjustable, and at least some amount of anti-aliasing of the surrounding pixels can be utilized as well in at least some embodiments. The user can cause additional areas 508 of the same or a different pattern to be added to the image, for example, such as to include patterns with different types of objects that might be added in the same, or different, colors or style. The pattern regions can also be caused to overlap or blend with each other, among other such options.

Figures 6A, 6B:
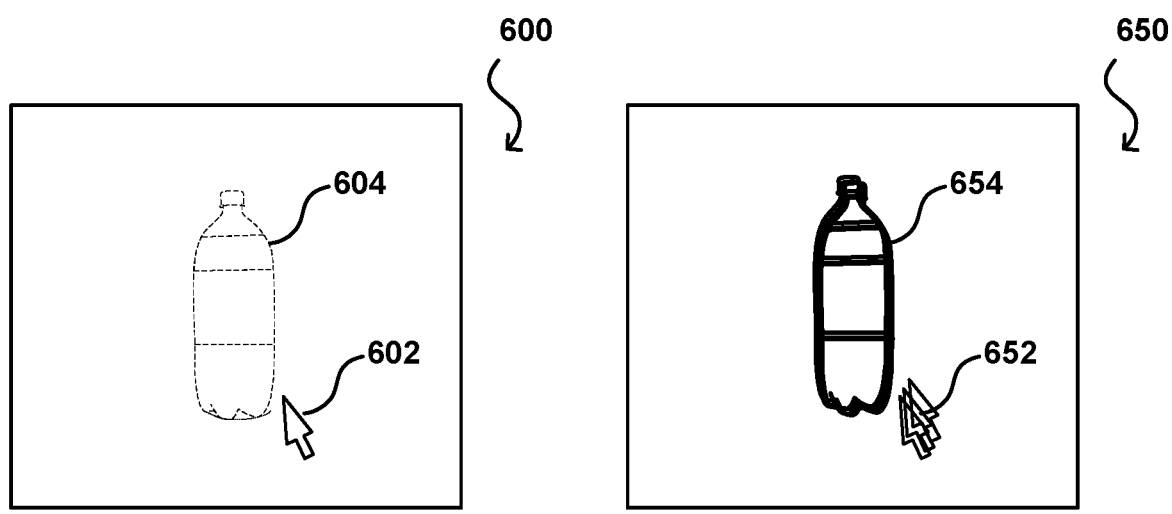
FIGS. 6A and 6B illustrate an example process for controlling an amount by which image data for an object is added into an existing image that can be utilized in accordance with various embodiments.

FIGS. 6A and 6B illustrate another example image editing or creation approach that can be utilized in accordance with various embodiments. In this example the user can choose to add a single object to an image, or at least a single object for each designated position. Here, a user can touch a touch screen, click a mouse button, or provide another selection input that can cause a single object impression to be added to an image. The gradient of an image patch associated with a class label can be used to create an instance of an object where none currently exists, or to modify a region to look more like a class label. In the example image 600 illustrated in FIG. 6A, the user positions a mouse cursor 602 in a desired location and then "clicks" the mouse button, or performs a similar action, to cause a single instance of the object 604 to be added to the image. As mentioned previously, the amount by which the pixels of the object impression modify the corresponding pixel values of the image can vary or be adjustable among various embodiments. In the example image 650 of FIG. 6B, the user can perform additional selection actions, such as by repeatedly pressing the mouse button for a common location of a cursor 652 or tapping on a screen at such a location to increase an amount by which the pixel values for the object 654 are weighted and/or added to the existing pixel values for the image. In this way, a user can have relatively simple control over the amount by which the object impression modifies the image. A small number of selections might cause a faint impression to appear in the image, while a large number of selections might cause an impression to appear that nears an impression of an actual object represented in the image, although the representation will likely not be photo-realistic as discussed elsewhere herein.

Figure 5:
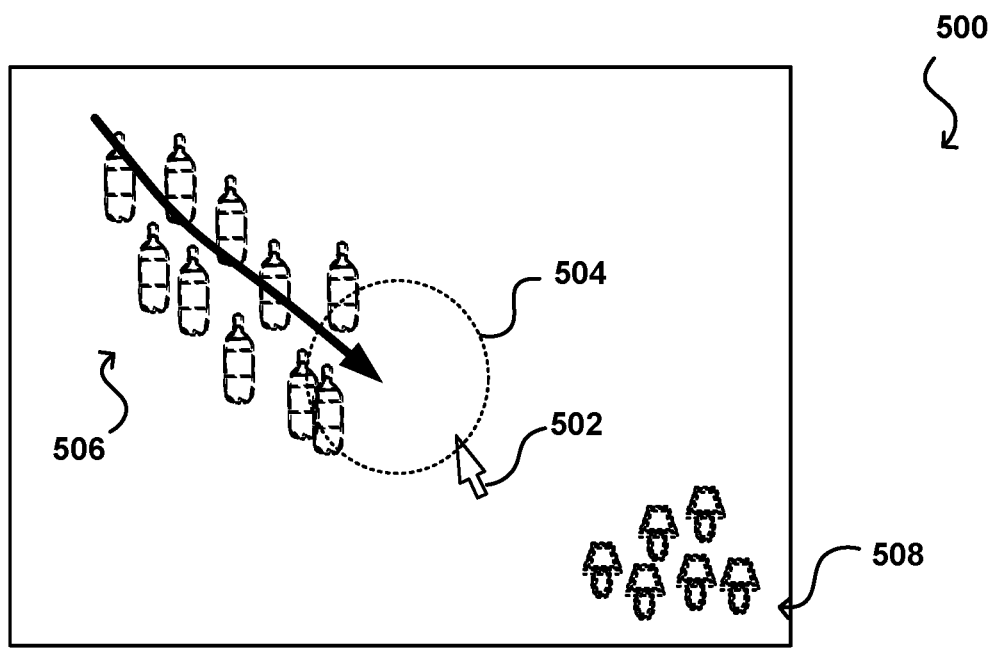
FIG. 5 illustrates an example image including regions that are painted using image data from a trained neural network that can be utilized in accordance with various embodiments.
Figure 7A:
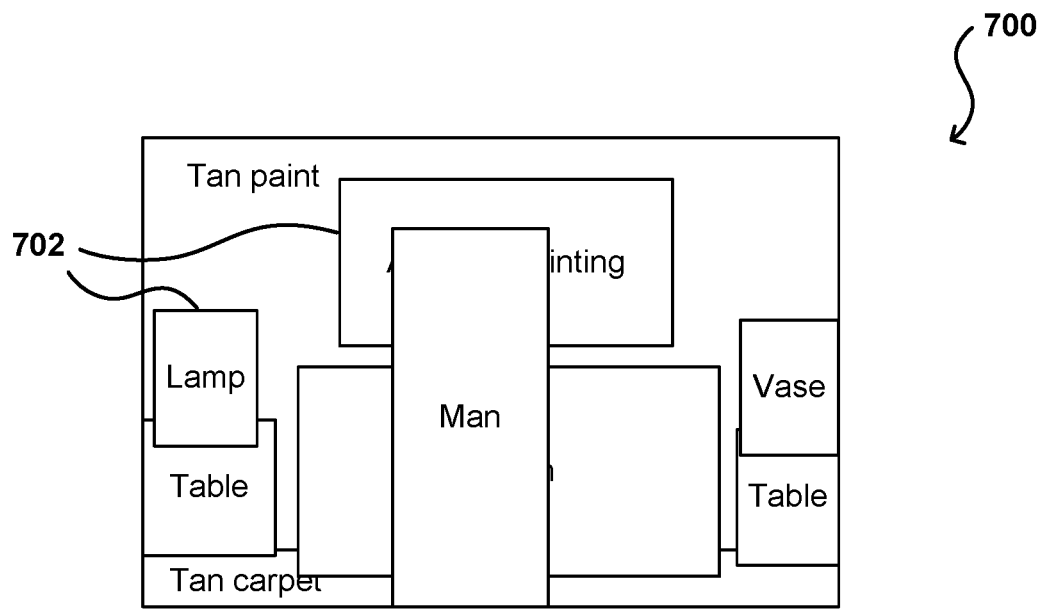
FIGS. 7A and 7B illustrates an example process for creating an image using object labels that can be utilized in accordance with various embodiments.
Figure 7B:
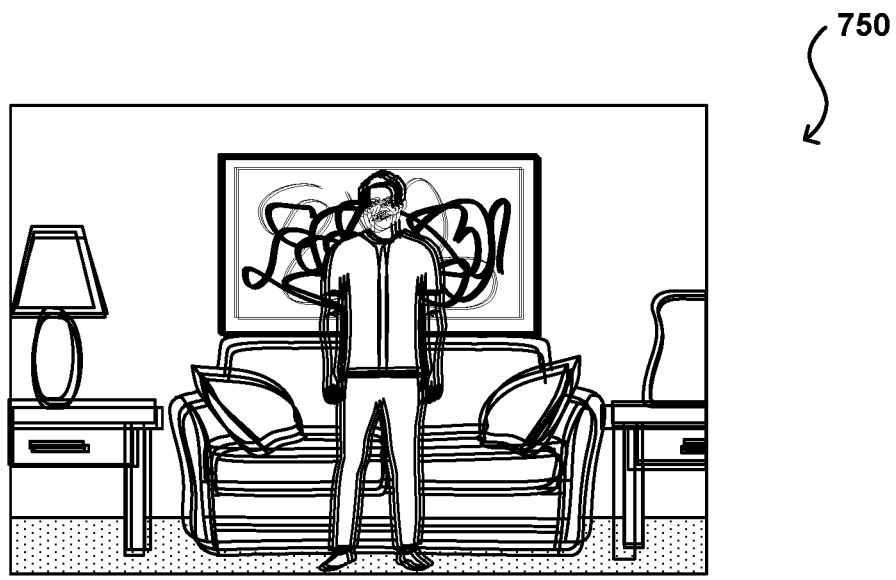

In some embodiments, as illustrated in FIGS. 7A and 7B, an artist or other user can create or edit images in part by placing labels or classifications at various points on an image canvas. In the example image 700 of FIG. 7A, a user has placed various label regions 702 at locations across an image canvas. In this example, the user is able to select the size and/or shape of the region as well, although in other embodiments the user might only be able to position a visualization and then edit the visualization once placed, etc. Here, the user is able to create an image with multiple objects by placing the regions at the desired locations until the user is satisfied, then requesting that the image be created. FIG. 7B illustrates an example image 750 that can be generated using such label regions. In this example, the visualizations for each of the labels or classifications is rendered with the approximate size and location. As indicated, the visualizations will not be photorealistic, but can provide an abstract or stylized view of the scene including the desired objects. Once created, a user can then edit or modify the various objects, as well as add or delete objects, as desired. In at least some embodiments each visualization acts as a separate layer in the image, in that it can be independently resized, moved, modified, etc. Various other tools can be utilized as well, such as to paint or pattern a region with object visualizations as discussed with respect to FIG. 5. This can include fills or other such tasks, as opposed to manual painting or other such action taken by the user.

Figure 8A:
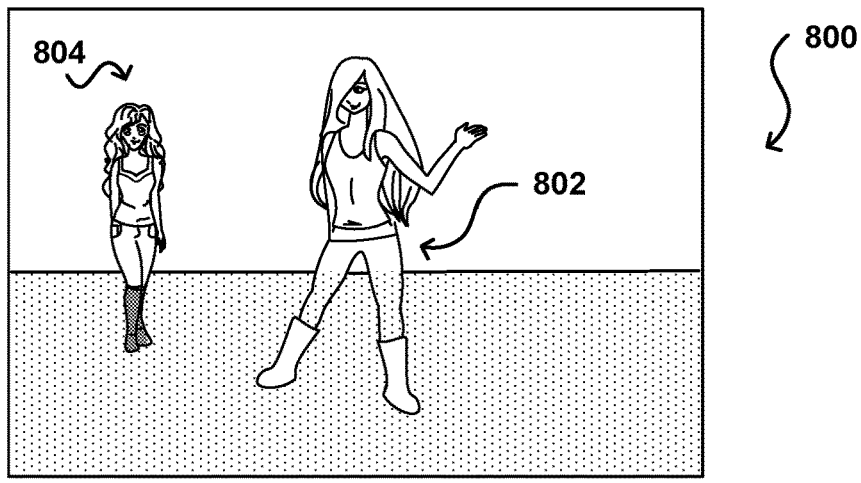
FIGS. 8A, 8B, and 8C illustrate an example process for using texture data from a trained neural network to replace an object represented in an image that can be utilized in accordance with various embodiments.
Figure 8B:
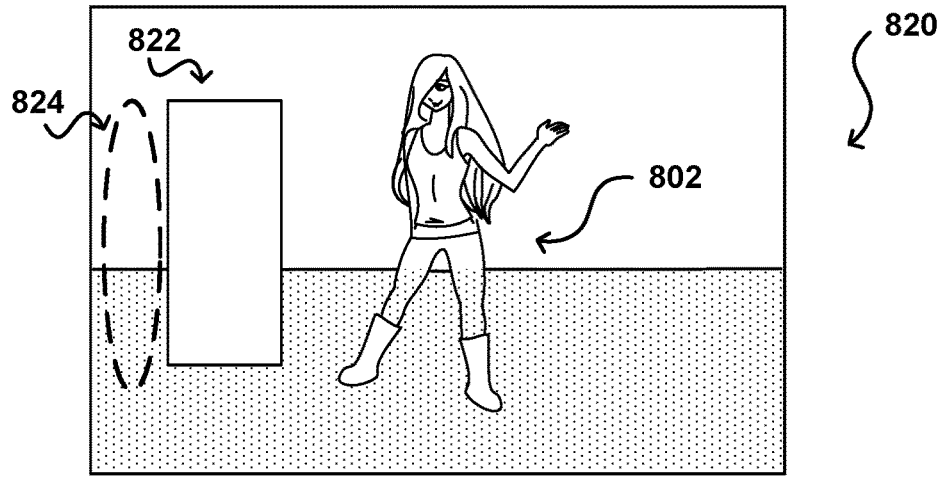
Figure 8C:
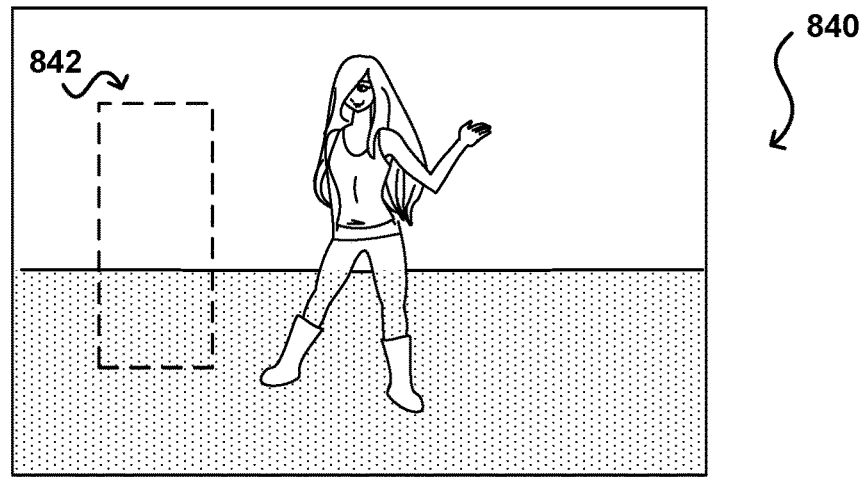

FIGS. 8A-8C illustrate another example image editing process that can take advantage of aspects of the various embodiments. In this example, a user has obtained an image 800 as illustrated in FIG. 8A that includes a representation of a first person 802 in the foreground and a second person 804 in the background. It might be the case that the user likes the image, but wants to remove the representation of the second person 804 from the image. The user can cut out or delete a portion of the image including the representation of the second person 822 as illustrated in the example image 820 of FIG. 8B. As known for image editing, the cut region will then likely have a solid color that does not match the surrounding portion of the image. Accordingly, a user can copy a nearby section of the image and paste into that section so that the region includes matching image areas, as may include the flooring and the wall or sky behind the second person. In many instances, however, the repetition of a nearby region will be apparent to one viewing the image, such that the final product may not be visually desirable.

Accordingly, approaches in accordance with various embodiments can enable a user to select one or more nearby regions 824 from which to sample a pattern or texture to be used to fill the region. In this example, the ground might include carpet, sand, grass, or other portions that can be used to train a neural network on that particular type of object (grains of sand, blades of grass, etc.). These objects can then be used to paint or fill the region as discussed previously. An added benefit to such an approach is that the placement of the pattern objects in the region can be relatively random, such that the pattern will match the surrounding regions but will not have the same pattern or arrangement, creating a natural look that will blend with the image and may not be detectable to a viewer of the image. Slight variations in color and shading can also be included for the individual objects in order to improve the natural appearance of the region. As illustrated in the example image 840 of FIG. 8C, the resulting image can have the second person removed and have the removed region filled with matching patterns that blend with the surrounding portions of the image.

The random, non-repeating nature of objects used for training can be useful in other applications as well. For example, camouflage specific to a particular region can be generated by using objects such as leaves and grass as training objects and then generating patterns that include these objects in a random fashion. The resulting image can then be printed on material or objects in order to enable them to blend into the background or otherwise enable them to difficult to perceive from a distance. Another advantage to such an approach is that it can be used to generate a lot of fine grain detail over a large region with minimal effort. A texture of any arbitrary size or resolution can be generated, which could be used to generate, for example, wallpaper with a pattern that never repeats. A digital image can also be generated that includes a high amount of detail without an artist having to go through and paint every single pixel. Such an approach can be particularly useful for virtual reality environments, where the resolution can be as detailed as necessary for very large areas without requiring a significant effort from an artist to paint the entire environment.

As mentioned, the ability to add a visualization can help to generate new images or scenes based upon known object types. The artist can apply a style or look for the abstractions or visualizations, or can use these as starting points to get the appropriate look, size, and shape. An artist can also use such an approach to add items to a scene or image, such as by adding a visualization of a blender to a picture of a kitchen counter by specifying the type of object and location, or using another such approach as discussed elsewhere herein. Various existing image editing tools can be used or applied as well, such as to change the size, shape, color, texture, etc. In some embodiments a visualization can be connected to a nearby object, or selected object, in a scene, which can cause the visualization to be added with similar size or scale, appearance, color, shading, etc.

Figure 9:
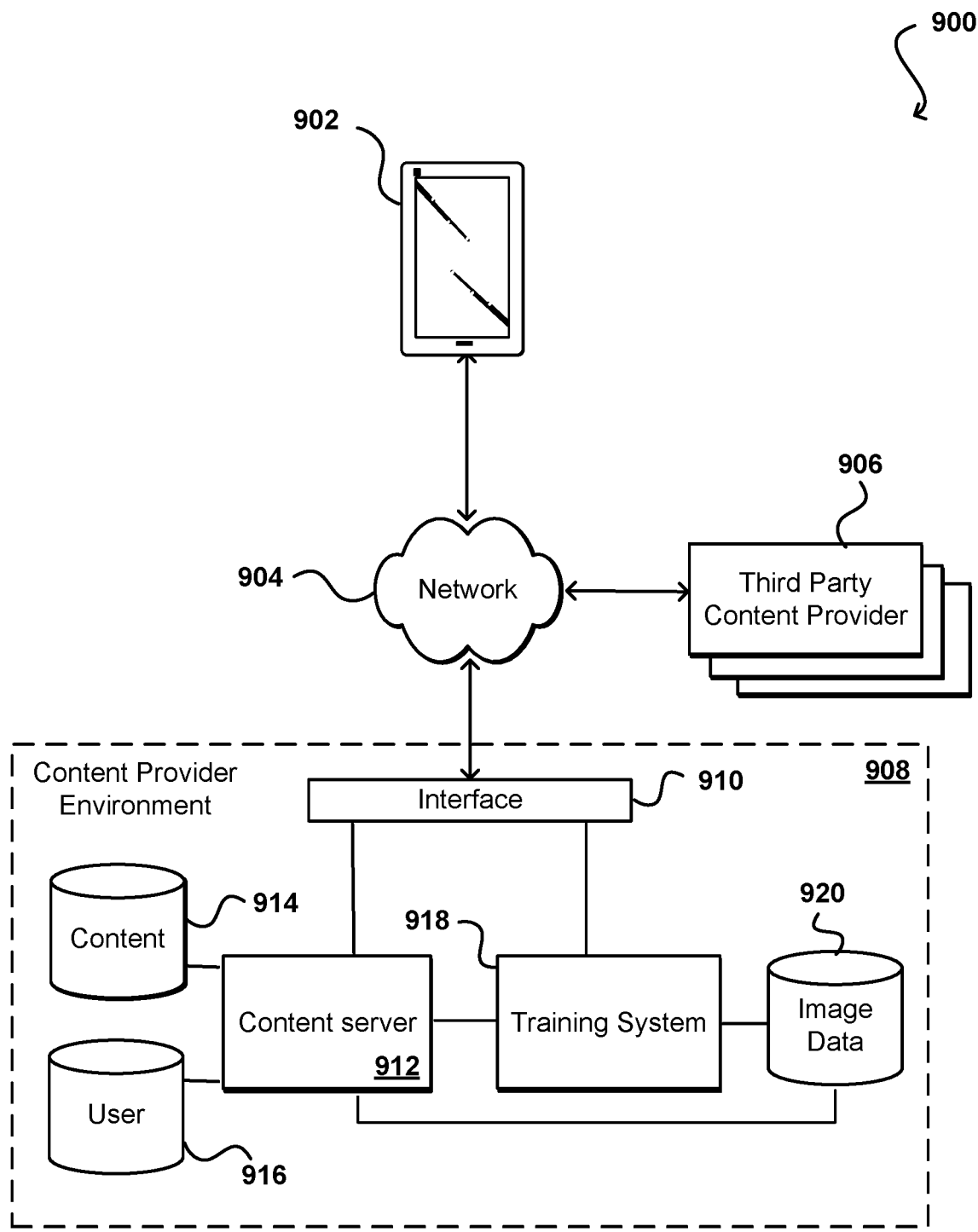
FIG. 9 illustrates an example system that can be utilized to implement aspects of the various embodiments.

FIG. 9 illustrates an example environment 900 that can be used to implement aspects in accordance with various embodiments. As mentioned elsewhere herein, various network training and image manipulation tasks can be performed on a client device or by a network service, among other such options. In FIG. 9, a client computing device 902 can submit a request for content across at least one network 904 to be received by a content provider environment 908. As mentioned, in at least some embodiments the request can include a classification or category title, for example, where the user wants to add image data for that classification to a new or existing image. The network(s) can include any appropriate network, such as the Internet, a local area network (LAN), a cellular network, an Ethernet, or other such wired and/or wireless network. The content provider environment 908 can include any appropriate resources for providing content from a resource provider, as may include various servers, data stores, and other such components known or used for providing content from across a network (or from the "cloud").

In this example, a call received to the content provider environment 908 can be received by an interface layer 910 of the environment. As known for network environments, the interface layer can include components such as interfaces (e.g., APIs), load balancers, request and/or data routers, and the like. If the request is a request for content, such as for content for image data to be provided to the client device, information for the request can be directed to one or more content servers 912, which can obtain the content from a content data store 914 or other such repository to be sent back across the network(s) to the computing device. In some embodiments, information for the request might also be compared against user data in a user data store 916 or other such location to determine, for example, whether the user has access rights to that content. In some cases, a call or request received to the content provider environment 908 might be from another entity, such as a third party content provider 906. As discussed previously, such providers may provide images and information to be displayed to users along with the served content. This content may relate to a specific item, product, or other such object associated with a product. At least some of these images can be used to train neural networks as discussed herein. In some embodiments the content provider network will call into such a third party system for the content.

The interface layer can determine the type of call or request and cause information to be forwarded to the appropriate component or sub-system. For example, training images can be stored to a data store 920 for use in training a neural network by a training system or service 918, with the resulting training sets being stored to the same or a different data store 920, or the content repository 914. When a request for image data is received for a classification, that request can be forwarded to the content server 912 which can pull the corresponding image data from an appropriate data store 914 or 920. A similar approach can be used for sound or video, for example, where data from a trained neural network can be provided in response to receiving a classification in order to provide audio and/or video data.

Figure 10:
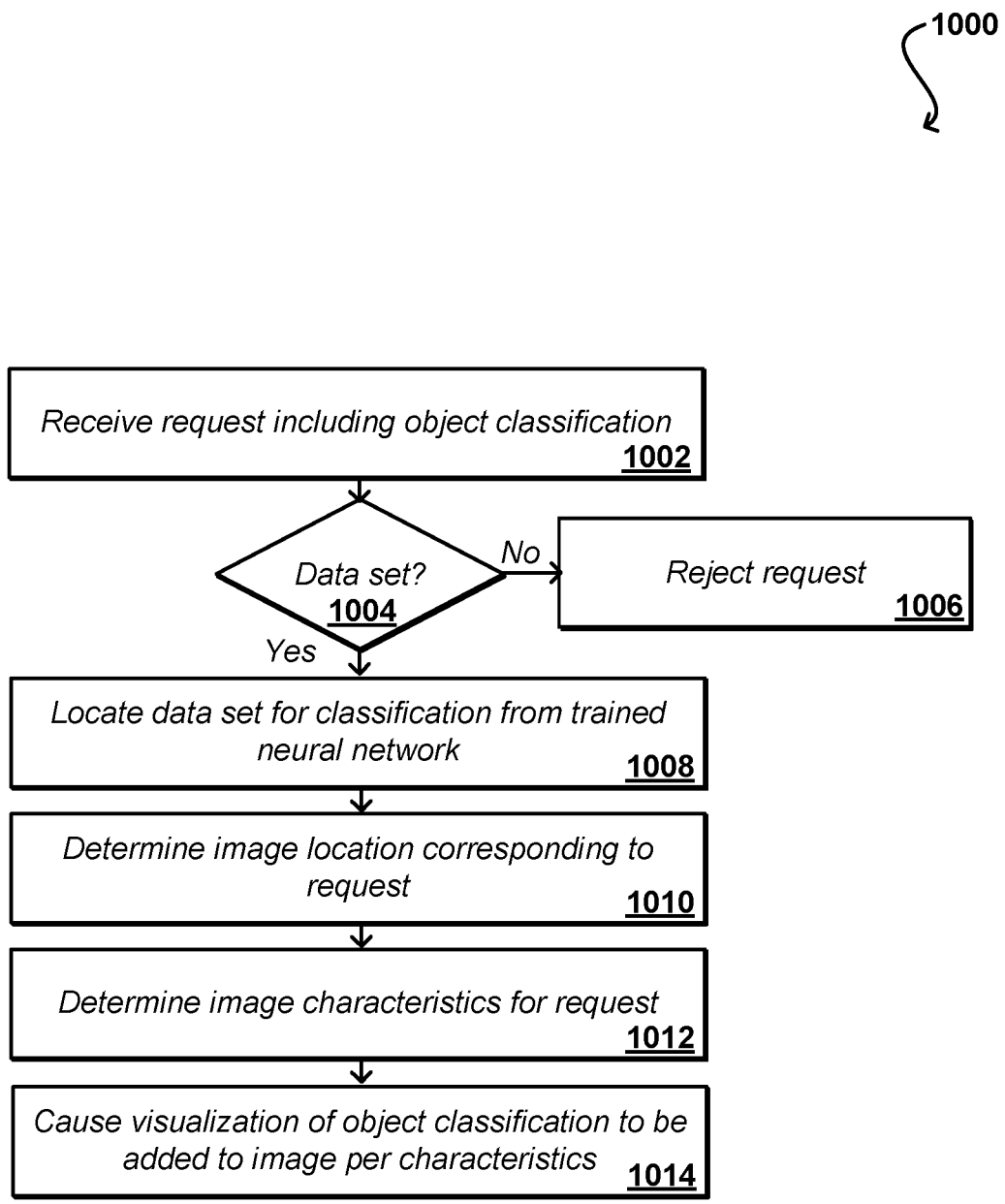
FIG. 10 illustrates an example process for adding a visualization to an image that can be utilized in accordance with various embodiments.

FIG. 10 illustrates an example process 1000 for determining an object of interest using barcode and position data that can be used in accordance with various embodiments. It should be understood that there can be additional, fewer, or alternative steps performed in similar or alternative orders, or in parallel, within the scope of the various embodiments unless otherwise stated. In this example, a request is received 1002 that specifies an object classification, category, or other identification. As mentioned, this can be a text query provided by a user, a selection from a list, obtained from a query image, or received from another such source. In this example, a determination can be made 1004 as to whether there is a corresponding data set available for that classification. As mentioned, a search or matching process can be executed to attempt to determine whether an available data set matches the request with a minimum level of confidence. For example, in some embodiments a "shirt" classification might sufficiently match a "t-shirt" data set while in other embodiments the specific type of shirt might be required for a specific match, which can depend at least in part upon the granularity of image categorizations used to train the respective neural network(s). In some instances a neural network may simply have not yet been trained for that particular classification, among other such possibilities. If no matching data set can be located, the request can be denied 1006. In some embodiments, the user can have the option to train a neural network for the specific classification, which can then be used to add a visualization for that classification to the image canvas.

If a data set for the classification exists, the data set can be located 1008 either locally or from a remote source. In at least some embodiments, the data sets can be stored in different locations than where the neural networks are trained, and data sets might be available from multiple sources. Once the data set is located, a process can attempt to utilize that data to update an existing image or create a new image using a visualization of that data set. In this example, the request can be associated with a particular image. Based at least in part upon the request, a location in the image can be determined 1010 where the visualization is to be added or placed. One or more characteristics for the visualization can also be determined 1012. These can include, for example, the size, style, color, weight, and other such aspects. These can be set ahead of time and/or adjusted after placement in at least some embodiments. A visualization of the object corresponding to the data set can then be caused to be added to the image per the specified characteristics. As mentioned, this can include blending the pixel values from the image data set with the corresponding values of the pixel locations in the image, or setting the pixel values to pixel values corresponding to the data set per the specifications, among other such options.

Figure 11:
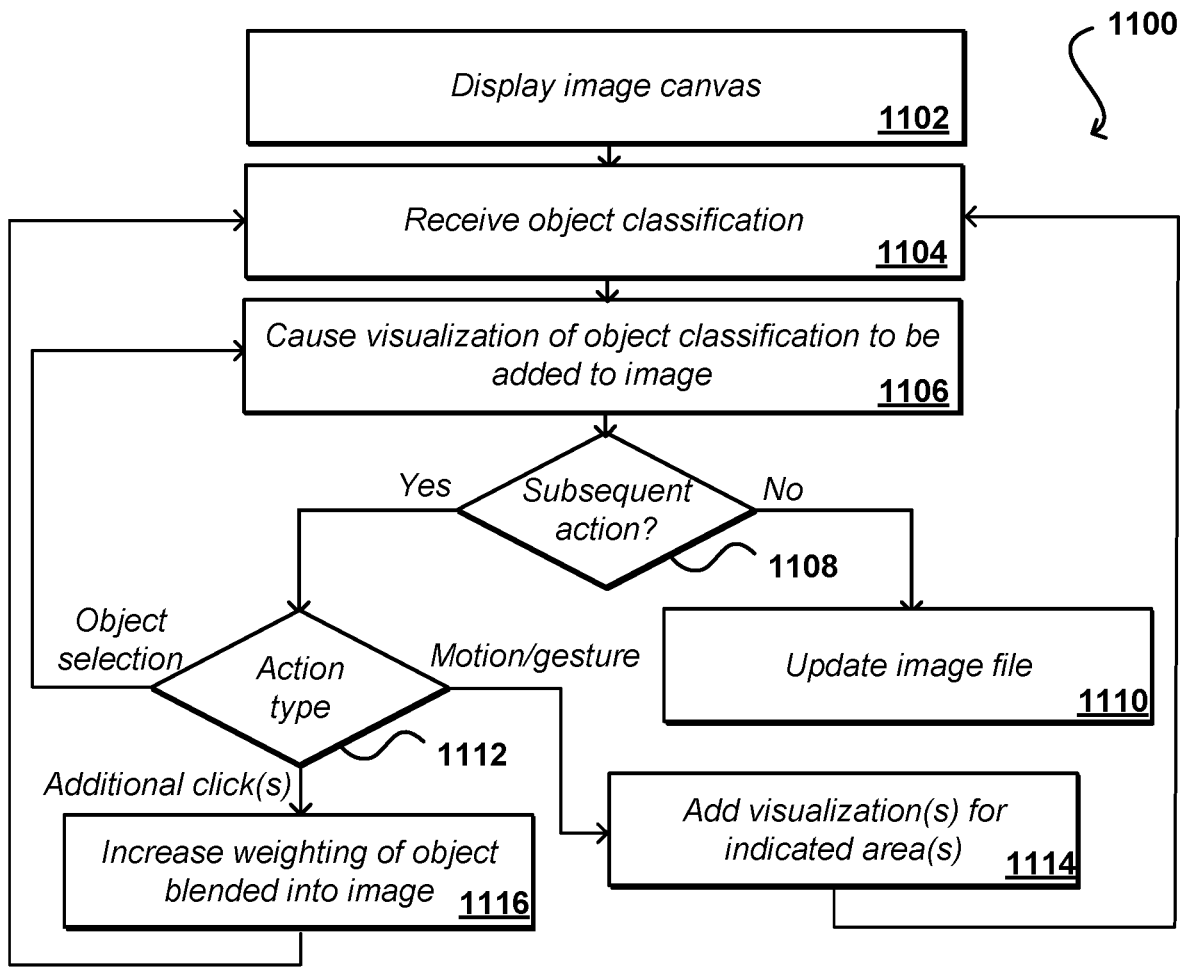
FIG. 11 illustrates an example process for modifying a visualization added to an image that can be utilized in accordance with various embodiments.

Once a visualization of an image categorization is added to an image, further updates to the image can be made using the same or other visualizations. For example, in the process 1100 illustrated in FIG. 11 an image canvas is displayed 1102 and an object classification received 1104, such as from a user or artist. A visualization of an object classification, such as that discussed with respect to FIG. 10, can then be added 1106 to an image. As mentioned, this can be an additional object added to an image or a new object added to a blank image canvas, among other such options. If there are no subsequent actions, such as where the user only wanted to add a single object, then the image file can be updated 1110 with the updated pixel values resulting from the addition. If an additional subsequent (and related) action is detected 1108, for example, then a determination of the type of action can be made 1112. In some embodiments, the user might select to add another object visualization to the image, in which case the visualization can be added 1106 as discussed previously. If additional selections are detected, such as additional mouse clicks or touch screen taps, then the weighting of an object visualization blended into the image can be increased 1116. As mentioned, the blending of the visualization with the existing pixel values can be increased in some embodiments by repeated input by the user, such as where the object will become increasingly visible or present in the image until such point that the user is satisfied with the appearance, after which the user will quit providing the repetitive input, etc. Another detected action can include the detection of a motion, gesture, or other such action associated with a paint, pattern or fill input, for example, in response to which one or more additional visualizations of that object classification can be added 1114 to the image, such as to create a pattern or fill based on the object type. Various other actions and updates can be performed or executed as well as discussed and suggested elsewhere herein.

Figure 12:
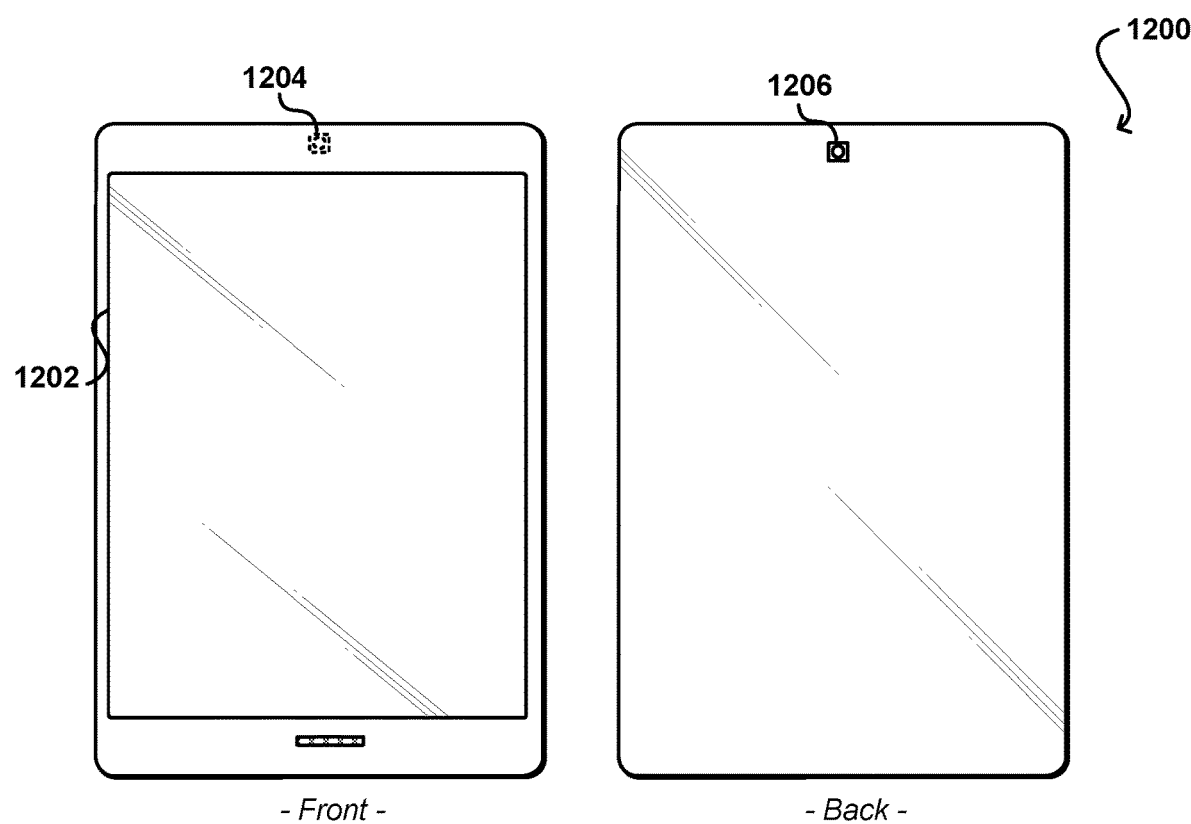
FIG. 12 illustrates front and back views of an example device that can be used in accordance with various embodiments.

FIG. 12 illustrates an example of a computing device 1200 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1200 has a display screen 1202, which under normal operation will display information to a user facing the display screen (e.g., on the same side of the computing device as the display screen). The computing device in this example can include one or more image capture elements, in this example including one image capture element 1204 on the back side of the device, although it should be understood that image capture elements could also, or alternatively, be placed on the sides or corners of the device, and that there can be any appropriate number of capture elements of similar or different types. Each image capture element 1204 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 13:
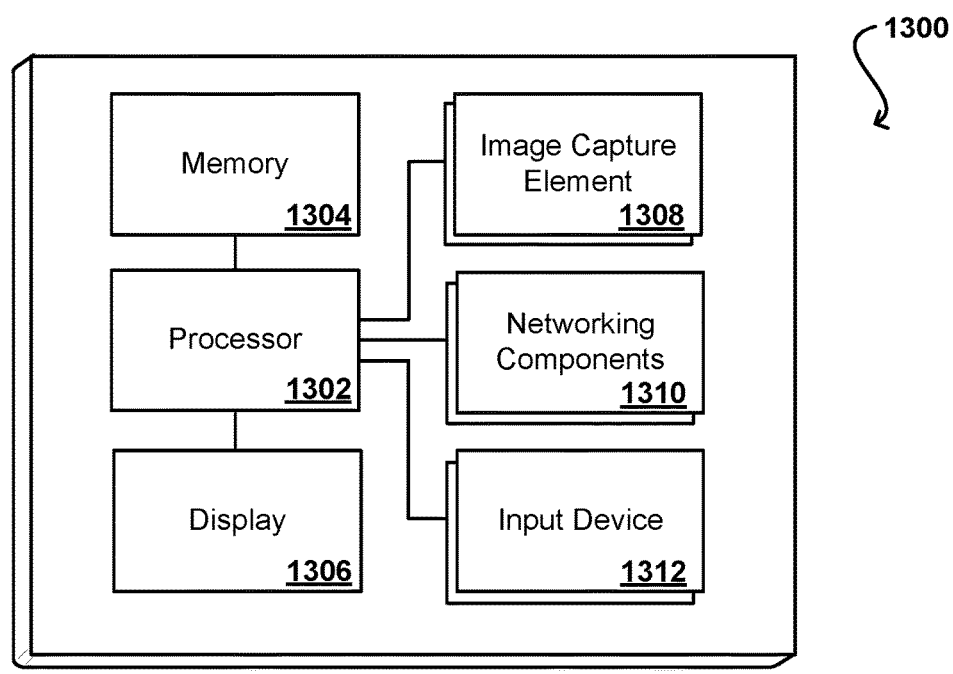
FIG. 13 illustrates an example configuration of components of a device such as that described with respect to FIG. 12.

FIG. 13 illustrates a set of basic components of a computing device 1300 such as the device 1200 described with respect to FIG. 12. In this example, the device includes at least one processor 1302 for executing instructions that can be stored in a memory device or element 1304. As would be apparent to one of ordinary skill in the art, the device can include many types of memory, data storage or computer-readable media, such as a first data storage for program instructions for execution by the processor 1302, the same or separate storage can be used for images or data, a removable memory can be available for sharing information with other devices, and any number of communication approaches can be available for sharing with other devices. The device typically will include some type of display element 1306, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1308, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 1310 enabling the device to communicate with remote systems or services such as content providers and rights determining systems. These components can include, for example, wired or wireless communication components operable to communicate over a network such as a cellular network, local area network, or the Internet. The device can also include at least one additional input device 1312 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request to modify an image file, the request indicating an object classification;
   obtaining a representation for the object classification, the representation from a neural network trained using a set of images that comprise representations of objects specified by the object classification;
   removing image data, corresponding to the representation, from the image file to cause a change in visualization of the representation; and
   filing portions in the image file with a matching pattern for a type of object represented in the image file.

2. The computer-implemented method of claim 1, wherein the change in the visualization is a stylized visualization change that is based at least in part upon a variety of shapes of objects used to train the neural network for the object classification.

3. The computer-implemented method of claim 2, further comprising:
   receiving at least one parameter for use in generating the stylized visualization, the at least one parameter including at least one of a size, aspect ratio, color, style, or weighting.

4. The computer-implemented method of claim 1, further comprising:
   causing additional representations of the type of object to be removed from the image file using the representation for the object classification, the additional representations specified by the request.

5. The computer-implemented method of claim 4, further comprising:
   filling additional portions in the image file where the additional representations are removed.

6. The computer-implemented method of claim 4, wherein an arrangement of the additional representations of the type of object is random and non-repeating within a specified region.

7. A system, comprising:
   at least one processor; and
   memory including instructions that, when executed by the at least one processor, cause the system to:
   receive a request to modify an image file;
   obtain a representation for an object classification from a neural network trained using a set of images that comprise representations of objects associated with the object classification;
   remove image data corresponding to the representation from the image file to cause a change in visualization of the image file; and
   add data to the image file for a pattern associated with a type of object represented in the image file.

8. The system of claim 7, wherein the instructions when executed further cause the system to:
   receive at least one parameter for use in generating a stylized visualization change for the change in the visualization, the at least one parameter including at least one of a size, aspect ratio, color, style, or weighting.

9. The system of claim 7, wherein the instructions when executed further cause the system to:
   cause additional representations of the type of object to be removed from the image file using the representation for the object classification, the additional representations specified by the request.

10. The system of claim 7, wherein an arrangement of the additional representations of the type of object is random and non-repeating within a specified region.

11. The system of claim 7, wherein the instructions when executed further cause the system to:
    determine a set of pixel locations associated with a representation of the type of object in the image data;
    determine a respective pixel value for an individual pixel location of the set of pixel locations;
    determine a corresponding pixel location in the image file for the individual pixel location; and
    blend the respective pixel value with the corresponding pixel value for the corresponding pixel location.

12. The system of claim 11, wherein the instructions when executed further cause the system to:
    change a weighting of the respective pixel value with respect to a corresponding pixel value for the corresponding pixel location to affect a visibility of the type of object in the image file when displayed.

13. The system of claim 7, wherein the instructions when executed further cause the system to:
    train neural network models using respective images for each of the object classifications; and
    obtain a respective representation for an individual trained neural network model, the respective representation being representative of a type of object associated with the object classification.

14. The system of claim 7, wherein the instructions when executed further cause the system to:
    enable the change in the visualization to be part of a plurality of visualizations having a random pattern that visually corresponds to at least one nearby region in the image file.

15. The system of claim 7, wherein the instructions when executed further cause the system to:
    compare the object classification of the request with a set of object classifications for trained neural networks; and
    select a matching object classification that corresponds to the object classification with at least a minimum level of confidence.

16. A non-transitory computer readable storage medium storing one or more sequences of instructions executable by one or more processors to perform a set of steps comprising:
    receiving a request to modify an image file;
    obtaining a representation for an object classification, the representation from a neural network trained using a set of images that include representations of objects associated with the object classification;
    removing image data corresponding to the representation, from the image file to cause a change in visualization in the image file; and
    add data to the image file for a type of object represented in the image file.

17. The non-transitory computer readable storage medium of claim 16, further comprising instructions executable by one or more processors to perform additional steps of:
    receiving at least one parameter for use in generating the stylized visualization, the at least one parameter including at least one of a size, aspect ratio, color, style, or weighting.

18. The non-transitory computer readable storage medium of claim 16, further comprising instructions executable by one or more processors to perform additional steps of:
    causing additional representations of the type of object to be removed from the image file using the representation for the object classification, the additional representations specified by the request.

19. The non-transitory computer readable storage medium of claim 16, further comprising instructions executable by one or more processors to perform additional steps of:
filling additional portions in the image file where the additional representations are removed.

20. The non-transitory computer readable storage medium of claim 16, further comprising instructions executable by one or more processors to perform additional steps of
determining a set of pixel locations associated with a representation of the type of object in the image data;
determining a respective pixel value for an individual pixel location of the set of pixel locations;
determining a corresponding pixel location in the image file for the individual pixel location; and
blending the respective pixel value with the corresponding pixel value for the corresponding pixel location.

* * * * *